3,322,720
PROCESS FOR ALTERING THE PARTICLE SIZE DISTRIBUTION OF ALPHA MONO-OLEFIN POLYMERS
James F. Dempsey, Claymont, Del., Habet M. Khelghatian, Springfield, Pa., and Richard P. Maloney, New Castle, Del., assignors to Avisun Corporation, Philadelphia, Pa., a corporation of Delaware
Filed Aug. 12, 1964, Ser. No. 389,124
20 Claims. (Cl. 260—45.85)

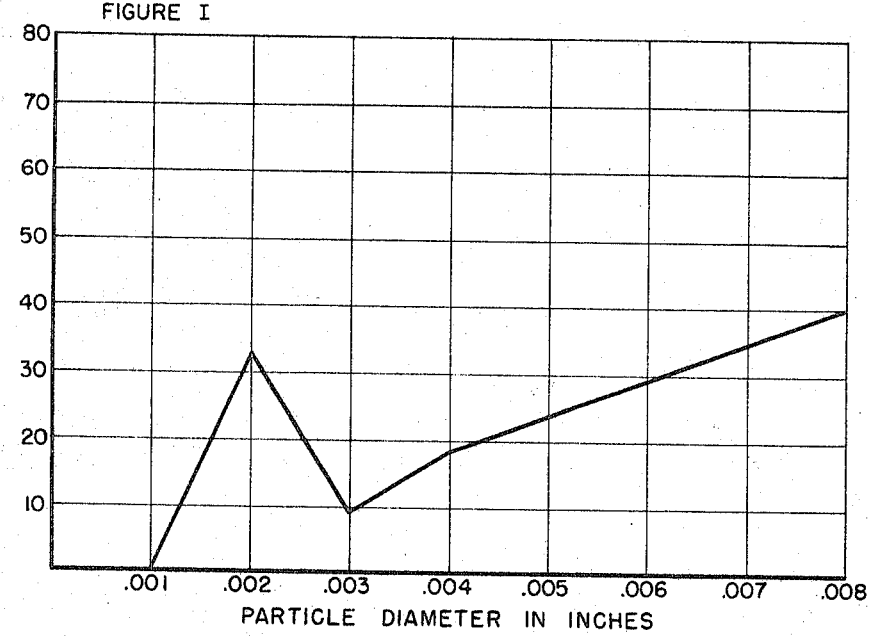
FIGURE I
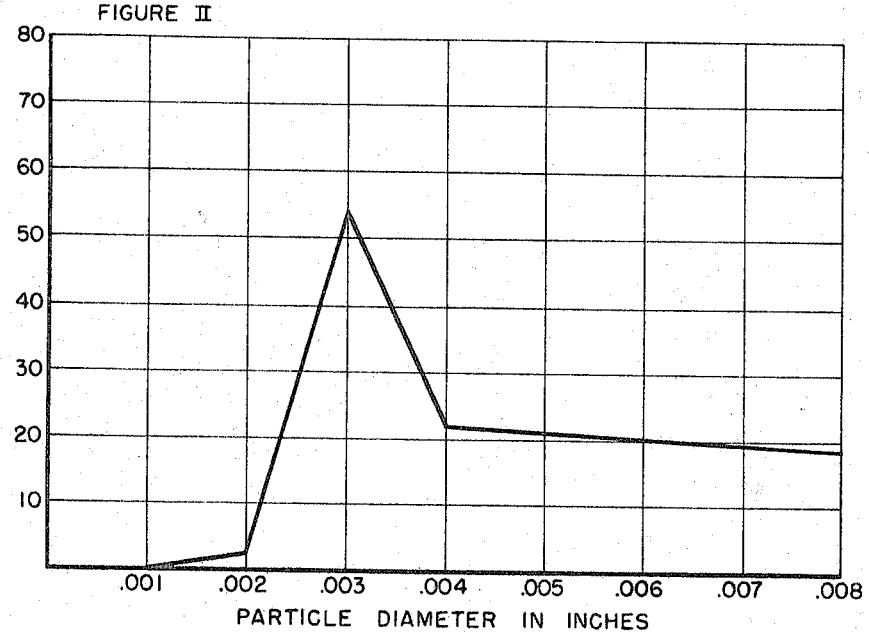
FIGURE II

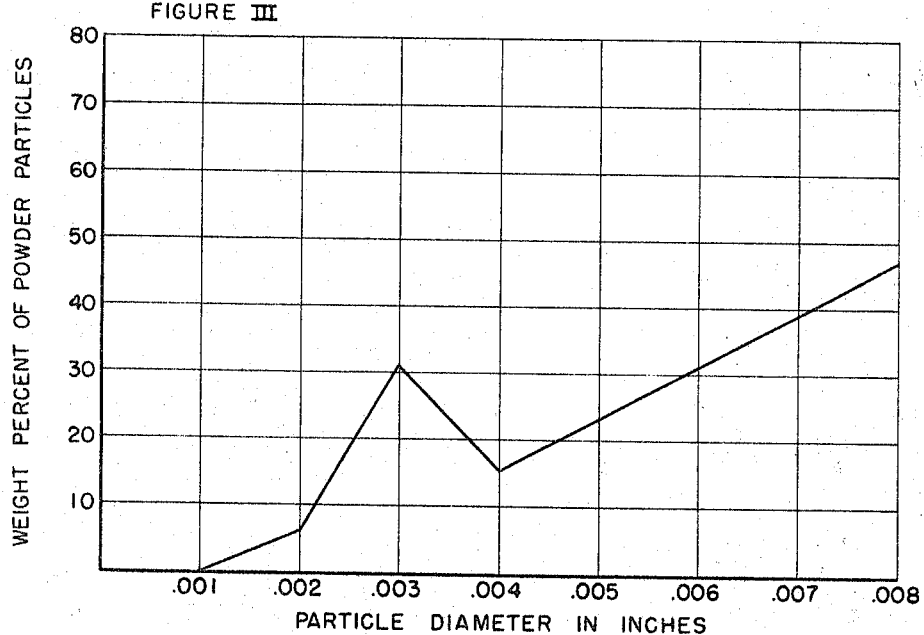
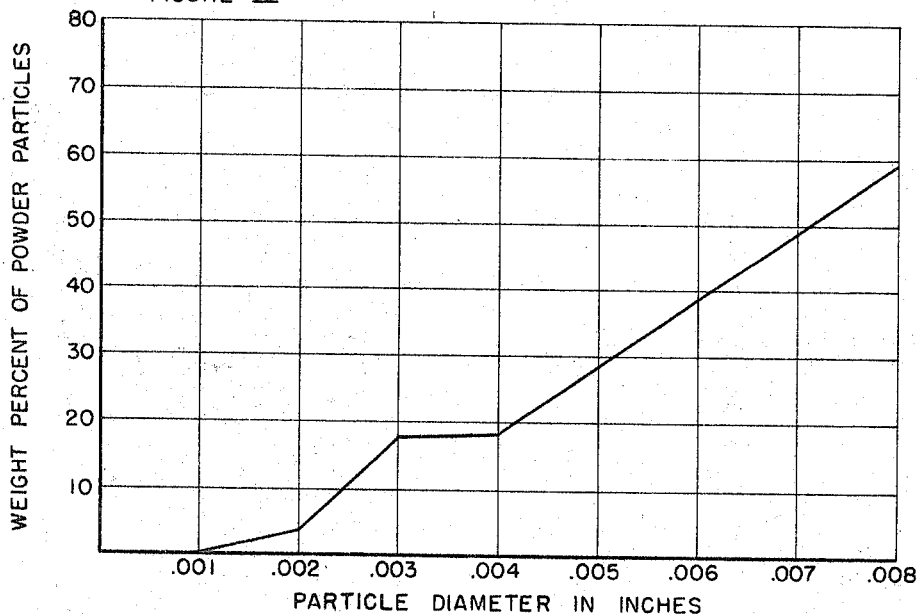

This invention relates to a process for rearranging particle size distribution of finely divided powders of alpha olefin polymers and copolymers and to a method of incorporating additives into said particles.

More particularly, this invention relates to a process by which a finely divided alpha olefin polymer powder having poor powder flow characteristics may be converted into a finely divided alpha olefin polymer powder having improved powder flow characteristics.

This invention relates to a process of agglomerating fine particles of polyolefin powders into larger particles by heating the substantially insoluble crystalline polymer obtained by the low pressure polymerization of alpha olefins in the presence of a small amount of the polymerization liquid and a larger amount of water in a hermetically sealed autoclave, which is agitated during said heating and subsequently flashing off the polymerization liquid to form larger sized agglomerated particles in the presence of the water and recovering the agglomerated particles of polymer powder.

This invention also relates to a method of encapsulating organic polymer additives into powder aggregates.

Alpha mono-olefins such as $C_2$ to $C_8$ olefins, including ethylene, propylene, butene-1, pentene-1, hexene-1, 4-methylpentene-1, and mixtures thereof, may be polymerized to high molecular weight polymers by the procedure and catalysts disclosed in United States Patent Nos. 2,827,446; 2,996,491; 2,996,493; 3,055,878; 3,061,601; and 3,099,647; and Belgian Patent Nos. 533,362; 534,792; and 534,888; and others. In the polymerization process the insoluble polymer precipitates from liquid components of the reaction medium in the form of finely divided particles characterized by particle diameters of less than 70 microns.

In the process of polymerizing alpha olefins, a small amount of the polymer product, which is substantially amorphous, is soluble in the inert polymerization solvent. In the process of separating the insoluble polymer powder from the polymerization liquid, e.g., by centrifuging, most of the soluble polymer is separated from the insoluble powder and is carried off with the polymerization liquid. However, a small portion of the soluble polymer remains in the polymer wet cake which is recovered after centrifuging of the polymer inert hydrocarbon liquid slurry. The wet cake usually contains from 20 to 80 weight percent of the polymerization liquid which contains from 1 to 5 percent of the soluble polymer. Substantially all of the soluble polymer may be separated from the insoluble polymer by subsequent reslurrying of the wet cake in fresh polymerization liquid followed by centrifuging to remove the added solvent and remaining soluble polymer. The wet cake, which is substantially free from soluble polymer, is then oven dried to remove any remaining polymerization liquid and leaves a very finely divided polymer powder which is characterized by particle size diameter of less than 70 microns which powder is characterized by poor flow properties which render it difficult to process in standard polymer finishing equipment.

If a wet cake from the above-disclosed centrifuging step containing some polymerization solvent and soluble polymer is oven dried without total removal of the soluble polymer fractions, the resulting dried powder is found to have a slightly different distribution of particle sizes. In the oven drying process, the polymer is heated and tumbled in an inert atmosphere at temperatures sufficient to drive off remaining volatile polymerization solvent. The removal of the polymerization solvent deposits the soluble, substantially amorphous polymer which is tacky to the touch on the insoluble powder and thereby forms some agglomerates with the finely divided insoluble polymer powder.

The resulting dried powder is characterized as having a high concentration of fines; that is, particles having a diameter less than 70 microns and an equally large concentration of agglomerated particles having particles diameters greater than 200 microns and a small concentration of particles having a diameter falling within the range of 70 to 200 microns. This type of powder is also found to have poor flow characteristics and has been found difficult to process in standard polymer powder finishing machinery.

A known method of processing polyolefin polymer powder to make large agglomerates of the powder consists of adding an antisolvent to the powder solvent slurry so as to precipitate the soluble polymer out of the polymerization solvent so that all of the polymer is recovered in the wet cake. However, the inclusion of relatively small concentration, i.e., 2 to 10 percent, of amorphous soluble polymer in the finished insoluble powder has significant detrimental effects on the physical properties of molded specimens of that product. These detrimental effects contribute to an inferior product which renders such a polymer unattractive for commercial uses. Also, finished polymer powders made by the aforementioned procedure are composed mainly of large agglomerates which result in a powder having a low bulk density, which is commercially unattractive for storage, shipping, and processing purposes. It has been found that a finished polymer powder which has both good flow properties for extrusion and other purposes and an attractive bulk density range is a polymer powder whose particle sizes are substantially greater than 70 microns and preferably within the range of 70 to 250 microns.

United States Patent No. 3,020,268 to Henry G. Schutz et al. relates a process of agglomerating finely divided powder particles of alpha olefin polymers by heating said polymers in the presence of high-boiling organic solvents and mixtures thereof and then cooling the polymer solvent slurry prior to recovering polymer powder. The Schutz et al. process contains several inherent processing and economic disadvantages which may be overcome by the use of the process of the present invention. Commercial polyolefin polymerization processes normally employ low-boiling hydrocarbons such as pentane, heptane, or hexane, as polymerization diluents because of the relatively low cost of said hydrocarbon diluents and also because of the low solubility of crystalline polyolefins in said diluents.

The Schutz et al. patent discloses that low-boiling hydrocarbons such as heptane are not effective for polymer powder agglomeration by the methods of their invention. Therefore, higher boiling hydrocarbons such as n-decane are a necessary part of said process. The high cost of solvents such as decane, as well as the realtively high solubility of polyolefins in said solvents, prohibits their use in a commercial polyolefin polymeridation process. In the commercial practice of the Schutz et al. process, it is economically advantageous to first polymerize olefin monomers in low-boiling hydrocarbon diluents and then remove the low-boiling hydrocarbon polymerization diluent from the solid polymer powder by centrifuging and filtration. The powder is then reslurried with the agglomerating medium, and the agglomeration process is accomplished. Recovery and purification of the agglomeration medium is a necessary step when such costly solvents are used. A further disadvantage of the Schutz et al. process is the added step of cooling the polymer agglomerate slurry prior to recovery. This phase of the process requires additional equipment and is time consuming, factors which contribute added costs to the polymer process. Further, after agglomerating the polymer powder in the Schutz et al. process, said slurry must be centrifuged, filtered, and heated in order to recover a dry polymer powder.

All of the herein-disclosed disadvantages to the prior art may be overcome by the process of the present invention, wherein a slurry of crystalline alpha olefin polymer in a polymerization solvent such as pentane, hexane, or heptane is centrifuged to substantially remove the solvent and produce a polymer wet cake containing about 50 percent by weight of finely divided polymer powder. The wet cake is subsequently reslurried in an autoclave containing a volume of water at least equal to that of the wet cake. In the agglomeration process of the present invention, the remaining polymerization solvent is flashed off, recovered, and may be recycled, and a dry agglomerated polymer powder is recovered from the surface of the remaining water and is processed without further centrifuging or filtration. The advantages of fewer processing steps, as well as avoiding the use of costly solvent, render the process of the present invention as a distinct improvement over the methods disclosed in the prior art.

It has now been discovered that alpha olefin polymers synthesized by the above-disclosed procedures and having particle size distributions which are not conducive to producing a free-flowing powder may be processed so as to rearrange the particle size distribution of said alpha olefin polymer powder to produce a powder having improved flow properties while maintaining a commercially attractive bulk density.

The term "alpha olefin polymers" as is disclosed herein is meant to include homopolymers and copolymers of alpha olefins as well as mixtures thereof.

It has now been discovered that particle size distribution of finely divided alpha olefin polymer powder may be rearranged by a pressure-temperature treatment wherein previously insoluble polymer is made partially soluble by treating said polymer at elevated temperatures and superatmospheric pressure in the presence of the polymerization medium and a nonsolvent such as water, wherein said soluble polymer is subsequently reprecipitated to form agglomerates of larger particle size with the insoluble polymer powder particles by rapidly flashing off the polymer solvent and leaving the soluble and insoluble polymer powder to agglomerate in the presence of water.

More specifically, an alpha olefin or mixtures thereof is polymerized in the presence of an inert hydrocarbon liquid by a coordinated catalyst complex in the temperature range of 0 to 100° C., preferably 40 to 80° C., in a pressure range of 0 to 10 atmospheres and preferably 0 to 100 p.s.i.g. The resultant insoluble polymer precipitates from liquid components of the reaction medium in the form of finely divided particles having surface diameters of less than 100 microns. The polymer hydrocarbon slurry is subsequently treated with a polar medium such as alcohol or water to deactivate the catalyst. The resultant polymer powder is separated from the major portion of the liquid of the slurry by centrifuging or other means which leaves a polymer wet cake.

The polymer wet cake consisting of about 20 to 80 percent by weight of a finely divided alpha olefin polymer or copolymer powder and about 20 to 80 percent by weight of an inert solvent selected from a group consisting of $C_5$ to $C_6$ saturated hydrocarbons boiling at less than 100° C. is slurried in an autoclave having a means for agitation with at least an equal volume of water, preferably containing at least .005 percent by weight of a surfactant. The autoclave is hermetically sealed and heated to the desired temperature within the range of 100 to 300° F. and agitated for the time necessary to bring a sufficient portion of the polymer in a soluble state in the polymerization solvent so as to cause agglomeration of the insoluble powder particles when the soluble fraction is subsequently reprecipitated by flashing off the polymerization solvent.

After removal of the polymerization solvent, the polymer powder floats on the surface of the remaining liquid which is substantially water, and said polymer powder is found to be relatively dry and free of the polymerization solvent. The temperature range of the process is maintained above the boiling point of the inert polymerization liquid and at least 60° C. below the melting point of the polymer, and an autogenous pressure is maintained within the sealed autoclave prior to flashing off the low-boiling solvents. It is theoretically conceived that, by maintaining a superatmospheric pressure within the autoclave containing the slurry of surfactant, water, polymerization solvent, and polymer powder, and heating said autoclave contents above the boiling point of the polymerization solvent, a fraction of the polymer powder not ordinarily soluble under standard temperature and pressure conditions becomes soluble and is dissolved in the liquid phase of the polymerization solvent portion of the slurry. When the superatmospheric pressure is released, the polymerization solvent having a higher vapor pressure than water will flash off, causing the soluble polymer to precipitate and agglomerate the insoluble powder particles and also encapsulate additives therein. The resultant polymer powder agglomerates are insoluble in water and are less dense than water and, therefore, rise to the surface of the water and float thereon. The substantially solvent-free polymer powder is recovered and dried to remove any remaining liquids.

The processing temperature of the herein-disclosed method must be maintained below the point at which a large portion of the polymer becomes soluble. If this temperature maximum is surpassed, a solid mass of polymer forms which renders said polymer very difficult and economically unfeasible to process. The herein-disclosed examples illustrate this fact for polypropylene. The maximum limiting temperatures of processing other alpha olefins will become readily apparent to one skilled in the art without excessive experimentation.

The actual function of the surfactant in the present invention is not fully understood and is not a necessary part of this invention. However, it does appear that the addition of a surfactant to the polymer slurry prior to the agglomeration step contributes to larger particle formation and is, therefore, considered to be a part of the present invention.

It has also been discovered that, while accomplishing the objects of particle size rearrangement of alpha olefin polymer powders, another advantageous result may also be accomplished. It has been found that additives such as thermal and ultra violet stabilizers, slip agents, dyeing additives, and plasticizers may be incorporated into the polymer powder agglomerates by the processes disclosed herein so as to accomplish in situ stabilization and/or incorporation of additives to the dry polymer powder before it is exposed to heat and ultra violet light and thereby produce a more stable finished powder.

One or more of the polymer additives dissolved in low-boiling organic solvents are added to the water wet cake slurry prior to the agglomeration step. The additive solvent flashes off with the polymerization medium of the polymer wet cake, causing the additives to precipitate in the presence of the coprecipitating soluble polymer which results in the encapsulation of the additives in the polymer agglomerates formed. This procedure of incorporating additives into polymers is especially attractive when the additives are stabilizers. The polymer fraction which becomes soluble during the agglomeration process is believed to be substantially amorphous polymer. Recent polymer degradation studies, conducted by Winslow et al. of The Bell Telephone Research Laboratories and reported in the preprints of the Polymer Division of Polymer Chemistry of the Spring, 1962, meeting of the American Chemical Society at Washington, D.C., have indicated that focal points of initiation of degradation of olefin polymers are primarily in the amorphous regions of said polymers. When stabilizing polyolefin polymers by the methods of the herein-disclosed invention, the unique advantage of concentrating degradation inhibitors in the areas most susceptible to degradation is achieved. This advantage is not gained by any other procedure known to the art.

Also, by accomplishing the incorporation of additives into the powder agglomerates wherein powder fines are also eliminated, subsequent blending and pelletizing by melt extrusion is unnecessary, thereby eliminating these costly finishing steps. The elimination of these finishing steps offers economic advantages, as well as the advantages of less shear and thermal degradation, which is a common result of melt extrusion and pelletizing and is known to be detrimental to the physical properties of the final finished form of the polymer.

It is an object of this invention to rearrange the particle size distribution of alpha olefin polymer and copolymer powders so as to result in a powder having improved flow properties and an attractive bulk density while maintaining the good physical properties characteristic of that polymer.

It is also an object of this invention to incorporate stabilizers and other additives into a polymer powder by means of solvent slurrying and thereby produce an in situ stabilized polymer powder.

These and other objects of this invention will be more fully realized when taken in context with the methods disclosed herein.

A more preferred embodiment of the process of the present invention is disclosed in the following examples.

*Example I*

Propylene monomer is polymerized in a glass-lined, sealed reactor at a temperature of 160° F. and a pressure of 60 p.s.i.g. while dissolved in hexane and in the presence of a coordinated catalyst consisting of diethylaluminumchloride and titanium trichloride. The resultant polypropylene having a melting point of 165° C. is primarily isotactic with 92 percent of said polymer being insoluble in hexane at the polymerization temperature. The polymer solvent slurry is then discharged into a second reaction vessel (or kill tank) wherein the catalyst is deactivated by contacting said slurry with 10 volume percent of methanol. The polymer slurry is then discharged into a rotating centrifuge wherein a substantial part of the liquid phase of the polymer solvent slurry is removed, leaving a polymer wet cake.

A sample of the polypropylene powder wet cake prepared in the above-described manner and hereafter referred to as the control sample is analyzed and found to contain 47 percent by weight of volatiles. The control sample is subsequently dried in a heated vacuum oven for 24 hours and analyzed for particle size distribution after cooling to room temperature. The results of the particle analysis are listed in Table I.

*Example II*

A sample of polypropylene powder wet cake prepared in the manner previously described in Example I and containing 47 percent volatiles is processed to rearrange particle size distribution in the following manner.

Three thousand (3,000) grams of wet cake occupying about 3,000 cc. volume is charged to a 21,000 cc. steam-heated autoclave at room temperature. Five thousand (5,000) cc. of water containing .005 weight percent, based on the weight of the water, of "Igepal 630," a surfactant, is also charged to the autoclave provided with a steam jacket for heating purposes. The over-all slurry contains about 20 percent solids of finely divided polypropylene powder. The autoclave is then closed and sealed and provided with internal agitation while being heated to maintain the range of 200 to 205° F. for a period of two hours, the autogenous pressure being in the range of 32 to 36 p.s.i.g. At the end of two hours the hexane is flashed off and collected in a cold trap. The polymer powder is recovered from the remaining water on which it is floating and is subsequently dried in a vacuum oven and analyzed for particle size distribution.

*Example III*

A sample of polypropylene wet cake identical to that used in Example I is processed in the following manner.

Four thousand (4,000) grams of polypropylene wet cake containing 47 percent by weight of hexane and 6,000 cc. of water containing 0.1 percent by weight of "Igepal 630," a surfactant, are charged to a steam-heated 21,000 cc. autoclave at room temperature in the order of recitation. The resultant water-wet cake slurry contains about 20 percent by weight solids. The autoclave is sealed and maintained at a temperature in the range of 195 to 205° F. for two hours with an internal pressure in the range of 31 to 36 p.s.i.g. After the two-hour period the hexane is flashed off. The polymer powder is recovered from the reactor and dried in a vacuum oven. The dried polypropylene powder is then analyzed for particle size distribution, the results appearing under Example III in the table.

*Example IV*

A sample of polypropylene wet cake identical to that used in Example I is processed in the following manner.

One thousand (1,000) grams of polypropylene wet cake, containing 47 percent by weight of hexane and 2,000 cc. of water containing .01 weight percent "Igepal 630," a surfactant, are charged to a steam-heated autoclave of 10,500 cc. capacity at room temperature. The resultant water-wet cake slurry contained approximately 17 percent solids by weight. The autoclave is sealed and maintained at a temperature of 215 to 225° F. for one hour with an internal pressure of 45 to 50 p.s.i.g. After one hour the hexane is flashed off. The polymer powder is recovered from the reactor and dried in a vacuum oven. The resulting polypropylene powder is then analyzed for particle size distribution, the results of which appear as Example IV of the table.

*Example V*

A sample of polypropylene wet cake identical to that used in Example I is processed in the following manner.

Two thousand (2,000) grams of wet cake containing 47 percent by weight volatiles and 3,000 cc. of water containing .007 weight percent of "Igepal 630" surfactant are charged at room temperature to an autoclave having a means for agitation. The autoclave is hermetically sealed and heated to 240° F. and maintained at that temperature for two hours. The internal pressure of the autocalve under such conditions as herein described is 65 p.s.i.g. The process appeared to proceed as in previous examples; however, as the hexane was flashed off after a two-hour process time, the agitator began to exhibit difficulty in rotating. By the time all of the hexane had completely flashed off, the agitator was rotating with great difficulty. The autoclave was immediately cooled and opened. A solid mass of polymer was found inside the autoclave, indicating the maximum temperature at which reasonable agglomeration could be performed had been surpassed for this particular polyolefin.

*Example VI*

A mixture of olefin monomers containing 10 mole percent of ethylene and 90 mole percent of propylene is polymerized in a glass-lined, sealed reactor at a temperature of 150° F. and a pressure of 60 p.s.i.g. while dissolved in hexane and in the presence of a coordinated catalyst consisting of diethylaluminumchloride and titanium trichloride. The resultant substantially crystalline propylene-ethylene copolymer, having a melting point of 165° C. is primarily isotactic with 90 percent of said copolymer being insoluble in hexane at the polymerization temperature. The copolymer-solvent slurry is then discharged into a second reaction vessel (or kill tank) wherein the catalyst is deactivated by contacting said slurry with 10 volume percent of methanol. The copolymer slurry is then discharged into a rotating centrifuge wherein a substantial part of the liquid phase of the copolymer-solvent slurry is removed, leaving a polymer wet cake containing 51 percent by weight of volatiles.

A sample of the copolymer wet cake herein described is processed according to the method used in previously disclosed Example I, achieving substantially equivalent results.

*Example VII*

A sample of the copolymer wet cake described in Example VI is processed in the manner described in Example II, achieving substantially equivalent results.

One method of the present invention comprises adding to a polymer slurry prior to flashing off the polymerization liquid a quantity small, but sufficient to inhibit the polymer against degradation of a stabilizing material selected from a group consisting of hindered phenols, aromatic amines, epichlorohydrin condensates, sulfur-bridged bisphenols and benzophenone and its homologues. Thermal and ultra violet stabilizers may be added to a wet cake-water slurry as described in Examples II to VI prior to the agglomeration process by dissolving the stabilizers to be added in suitable solvents in which they are soluble. A suitable amount of stabilizer is dissolved in the solvent so as to produce the desired concentration in the finished dried powder. For example, if a concentration of 0.1 percent concentration of 2,6-ditertiarybutyl-4-methylphenol (BHT) is desired in the 1,500 grams of polymer in Example II, 1.5 grams of BHT is dissolved in 50 cc. of hexane and added to the slurry. Upon flashing off the hexane in the agglomeration process, the BHT precipitates with the soluble polymer and is thereby encapsulated in the polymer powder particles.

Dilaurylthiodipropionate (DLTDP) may be added to the polymer in a similar manner by dissolving the DLTDP in acetone or other suitable low-boiling solvents and adding the solution to the water-polymer wet cake slurry before the agglomeration process. The stabilizer solvent will flash off with the polymer solvent and cause precipitation of the stabilizer with the soluble polymer whereby the stabilizer is encapsulated in the polymer agglomerates. This process may be utilized for the addition of any polymer additives which have a high boiling point and are soluble in solvents having a low boiling point.

The results of rearrangement of particle size distribution are presented in Table I. The rearrangement in distribution of particle sizes in Examples II, III, and IV are quite evident. As shown in Table I, Examples II, III, and IV, which particle size distributions are plotted in FIGURES 2, 3, and 4, respectively, had improved flow properties. A comparison of particle size distribution to flow properties is shown in Examples I through V of Table I.

FIGURE 1 illustrates the particle size distribution of Example I which is the control sample of polymer powder which was not subject to the process of the present invention.

FIGURE 2 illustrates the particle size distribution of Example II which has been processed according to the method of the present invention and exhibits improved flow properties.

FIGURE 3 illustrates the particle size distribution of Example III which has been processed according to the method of the present invention and exhibits improved flow properties.

FIGURE 4 illustrates the particle sized distribution of Example IV which has been processed according to the method of the present invention and exhibits improved flow properties.

FIGURES 1 to 4 illustrate the rearrangement of particle size distribution of Samples I to IV, which has been achieved by the process of the present invention.

An evaluation of flow properties of polymer powders may be achieved in the following manner:

(a) An elongated clear glass quart jar fitted with a cap is filled half full with the powder to be evaluated. The jar is capped, placed in a horizontal position, and rotated or rolled slowly. If the powder flows freely in the jar in a manner similar to a liquid, with no bridging, build-up, or hang-up on the walls of the jar, it is termed a good flowing powder. If the powder flows unevenly in the jar with build-up and bridging occurring on the walls of the jar, the powder is judged to have poor flow properties.

(b) A second method of evaluation is a comparison of the quantity of powder which will feed through a screw-type melt extruder. The rate at which a powder can be melt-extruded may be directly related to the flow properties of that powder.

Any commercially available melt extruder may be used in polymer flow evaluation. The melt extruder used in the present evaluation consisted of a 27-inch long, 2-inch outside diameter, heated barrel having a conventional conical hopper at one end and a 0.25-inch orifice at the other. The heated barrel contained an 0.75-inch screw and a means for rotation of said screw. Samples I to IV, previously disclosed, were evaluated by the hereinabove procedures, and the results are recorded in Table I.

TABLE I.—WEIGHT PERCENT OF POWDER IN PARTICLE SIZE RANGE MEASURED IN MICRONS

|  | Proc. Temp. Range, °F. | Press. p.s.i.g. | Wt. Percent Surfac. | Proc. Time, hrs. | Distribution Range | | | | | Bulk Density | Feed Rate ¾' Extrud., lb./hr. | Characteristic Flow Properties |
| --- | --- | --- | --- | --- | --- | --- | --- | --- | --- | --- | --- | --- |
|  |  |  |  |  | >210 | 105-210 | 75-105 | 44-74 | <44 |  |  |  |
| Example I | | | Control | | 38.0 | 18.6 | 9.7 | 32.9 | 0.5 | 16 | 0.5 | Poor. |
| Example II | 200-205 | 32-36 | 0.55 | 2 | 18.7 | 21.9 | 56.4 | 2.9 | 0.0 | 20 | 1.0 | Good. |
| Example III | 195-200 | 31-35 | 0.1 | 2 | 47.0 | 14.8 | 31.0 | 6.3 | 0.3 | 20 | 1.0 | Do. |
| Example IV | 220 | 45 | .01 | 1 | 59.1 | 18.5 | 17.6 | 3.7 | 0.5 | 20 | 1.0 | Do. |
| Example V | 240 | 65 | .005 | 2 | | | Solid Mass | | | | | |

Particle size distributions of polymer powders disclosed herein were determined by using a series of United States Standard Sieves corresponding to the particle sizes reported. The procedure of particle size determination using the above-mentioned sieves is well known to those skilled in the art.

The additives which may be incorporated into polyolefin polymer powder particles by the process of the present invention are those polymer-improving additives known to the art which are soluble in low-boiling organic solvents and substantially insoluble in water. Known ultra violet and thermal stabilizers which are effective in inhibiting degradation of alpha olefin polymers and copolymers such as those disclosed in United States Patent No. 2,985,617 to Ivol O. Salyer et al. may be used in the process of this invention.

Slip agents known to the art such as long-chained $C_{10}$ to $C_{30}$ alkylamides may be used in the process of this invention as polymer-improving additives. These and other additives which are known to the art and have the required solubility properties disclosed herein may be used in the process of this invention without deviation therefrom.

The term "surfactant" as used herein is meant to describe the classes of surface-active compounds generally used as wetting agents for polymers, the nature of said surfactants being well known to the art, and such agents generally having an oleophilic portion of the molecule usually of hydrocarbon nature and another polar portion which may be provided by various functional groups such as hydroxyl, sulphate, carboxyl, carbonyl, amino, nitro, amido, ether, sulphonate, phosphate, phosphite, etc. Examples of suitable classes of surface-active agents which can be employed in the present invention are disclosed in Surface Active Agents and Detergents, Volume II, by A. M. Schwartz, J. W. Perry, and J. Birch, published by Interscience Publishers, Inc., New York, New York (1958), and in United States Patent No. 2,961,397. The specific surfactant used in the processing of the examples disclosed herein is an ethylene oxide alkyl phenol condensate manufactured by General Dyestuff Corporation and sold under the trade name "Igepal CO-630."

Organic compounds and organometallic complex dye receptors including silicic acid, ammonium alkylbenzenesulfonate, polybasic carboxylic acids, metal salts of fatty acids, amines, organic complexes of chromium salts, and others which are commonly known in the art as dye receptive compounds may be added to polymer powders prior to agglomeration in the process of this invention. Other compounds such as those recited in United States Patent Nos. 2,893,970 and 2,984,634; French Patent Nos. 1,315,298; 1,338,576; and 1,350,895; Belgian Patent Nos. 610,060; 631,671; 630,351; and 617,280; and others may be used in the practice of this invention without deviation therefrom.

Saturated $C_5$ to $C_6$ hydrocarbons which may be used in the process of this invention include normal and isopentanes, normal and isohexanes, cyclopentane, methyl cyclopentane and cyclohexane.

The foregoing examples are in no way meant to limit the scope of the present invention but rather serve as demonstrations of specific embodiments of the inventions disclosed herein.

We claim:

1. A method for rearranging the particle size distribution of crystalline alpha mono-olefin polymer powders obtained by polymerization of $C_2$ to $C_8$ alpha mono-olefins in the presence of an inert organic polymerization liquid selected from the group consisting of $C_5$ to $C_7$ saturated hydrocarbons and a coordination complex catalyst which comprises adding to one volume of a wet cake of finely divided solid crystalline polyolefin polymer containing 20 to 80 percent by weight of the inert polymerization liquid from about 1 to 10 volumes of water, heating said slurry in a closed autoclave within the range of 100 to 300° F. and maintaining autogenous pressure within said autoclave, agitating said slurry for a period of time necessary to condition said polymer to agglomerate a part thereof and form larger particles by flashing off the polymerization liquid whereby a polymer powder having a different particle size distribution in the range of 70 to 250 microns is recovered.

2. A method according to claim 1 wherein said autogenous pressure of the heated polymer slurry is from 0 to 100 p.s.i.g.

3. A method according to claim 1 wherein said $C_2$ to $C_8$ alpha olefin is ethylene.

4. A method according to claim 1 wherein said water contains from about .001 to 1.0 percent of a surfactant based on the weight of the water.

5. A method according to claim 1 wherein said $C_2$ to $C_8$ alpha olefin copolymer is crystalline propylene-ethylene copolymer.

6. A method according to claim 1 wherein said $C_2$ to $C_8$ alpha olefin is 4-methylpentene-1.

7. A method according to claim 1 wherein said $C_2$ to $C_8$ alpha olefin is propylene.

8. A method according to claim 1 wherein said alpha olefin polymerization liquid is hexane.

9. A method according to claim 1 including adding to polymer slurry prior to flashing off the polymerization liquid an organic polymer-improving additive, substantially insoluble in water and soluble in a low-boiling organic solvent.

10. A method according to claim 1 including adding to polymer slurry prior to flashing off the polymerization liquid a quantity, small, but sufficient to inhibit the polymer against degradation, of a stabilizing material selected from a group consisting of hindered phenols, aromatic amines, epichlorohydrin condensates, sulfur-bridged bis phenols, and benzophenone and its homologues.

11. A method according to claim 10 wherein said stabilizer is 2,6-ditertiary butyl-4-methylphenol.

12. A method according to claim 10 wherein said stabilizer is dilaurylthiodipropionate.

13. A method for rearranging the particle size distribution of crystalline polypropylene powder polymerized in the presence of an inert hydrocarbon liquid selected from the group consisting of $C_5$ to $C_7$ saturated hydrocarbons and a coordination complex catalyst which comprises adding to one volume of wet cake of finely divided polypropylene powder containing 20 to 80 percent by weight of the inert polymerization liquid from about 1 to 10 volumes of water containing .001 to 1.0 per cent of a surfactant based on the weight of the water, heating said slurry in a closed autoclave within the range of 150 to 235° F., and maintaining autogenous pressure within said autoclave, agitating said slurry for a period of time necessary to cause a part of said polypropylene powder to form larger particles by flashing off the inert hydrocarbon liquid whereby a polymer powder having a different particle size distribution in the range of 70 to 250 microns is recovered.

14. A method according to claim 13 wherein said polymer solvent is a $C_6$ saturated hydrocarbon.

15. A method according to claim 13 wherein said autogenous pressure of the heated polymer slurry is from 0 to 100 p.s.i.g.

16. A method according to claim 13 including adding to the polymer slurry prior to distilling off the solvent a quantity, small, but sufficient to inhibit the polymer against degradation, of a stabilizing material selected from the group consisting of hindered phenols, aromatic amines, epichlorohydrin condensates, sulfur-bridged bis phenols, and benzophenone and its homologues.

17. A method according to claim 16 wherein said stabilizer is 2,6-ditertiarybutyl-4-methylphenol.

18. A method according to claim 16 wherein said stabilizer is dilaurylthiodipropionate.

19. A method according to claim 13 including adding to polymer slurry prior to flashing off the polymerization liquid an organic polymer-improving additive substantially insoluble in water and soluble in a low-boiling organic solvent.

20. A method of incorporating polymer improving additives into particles of alpha olefin polymer powders obtained by polymerization of $C_2$ to $C_8$ alpha olefins in the presence of an inert organic polymerization liquid and a coordination catalyst complex which comprises adding to a wet cake of finely divided solid polyolefin polymer containing 20 to 80 percent by weight of the inert polymerization liquid selected from the group consisting of $C_5$ to $C_7$ liquid saturated hydrocarbons from about 1 to 10 volumes of water and a polymer-improving additive, heating said slurry in a closed autoclave within the range of 100 to 300° F., and maintaining autogenous pressure within said autoclave, agitating said slurry for a period of time necessary to condition said polymer to agglomerate a part thereof and form a varied distribution of particle sizes by flashing off the polymerization liquid, whereby a polymer powder having a different particle size distribution in the range of 70 to 250 microns is recovered.

References Cited
UNITED STATES PATENTS

| | | | |
|---|---|---|---|
| 3,004,019 | 10/1961 | Stevens et al. | 260—94.9 |
| 3,189,588 | 6/1965 | Hull et al. | 260—94.9 |
| 3,250,753 | 5/1966 | Kottenhahn | 260—94.9 |
| 3,251,428 | 5/1966 | Tabler | 260—94.9 |

FOREIGN PATENTS 797,344    7/1958   Great Britain.

DONALD E. CZAJA, *Primary Examiner.*

LEON J. BERCOVITZ, *Examiner.*

G. W. RAUCHFUSS, V. P. HOKE, *Assistant Examiners.*